(12) United States Patent
Freedman et al.

(10) Patent No.: US 10,286,329 B2
(45) Date of Patent: May 14, 2019

(54) MOTION SIMULATION AMUSEMENT PARK ATTRACTION

(71) Applicant: Universal City Studios LLC, Orlando, FL (US)

(72) Inventors: Daniel Freedman, Ocoee, FL (US); Nathanael G. White, Orlando, FL (US); Paula Stenzler, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/852,727

(22) Filed: Dec. 22, 2017

(65) Prior Publication Data
US 2018/0304163 A1 Oct. 25, 2018

Related U.S. Application Data

(60) Provisional application No. 62/489,895, filed on Apr. 25, 2017.

(51) Int. Cl.
*A63G 31/16* (2006.01)
*A63G 21/20* (2006.01)
(Continued)

(52) U.S. Cl.
CPC ............. *A63G 21/20* (2013.01); *A63G 7/00* (2013.01); *A63G 31/08* (2013.01); *A63G 31/14* (2013.01); *A63G 31/16* (2013.01); *G06T 19/006* (2013.01)

(58) Field of Classification Search
CPC . A63G 7/00; A63G 9/00; A63G 21/00; A63G 21/22; A63G 31/00; A63G 31/16
(Continued)

(56) References Cited

U.S. PATENT DOCUMENTS

| 5,490,784 A | * | 2/1996 | Carmein | A63B 22/02 434/29 |
| 5,979,333 A | * | 11/1999 | Houben | A63G 21/22 104/63 |

(Continued)

FOREIGN PATENT DOCUMENTS

| DE | 20217754 U1 | 3/2003 |
| EP | 2253362 A1 | 11/2010 |

(Continued)

OTHER PUBLICATIONS

Motorcycle Roller Coaster—The Gentleman Racer; http://www.thegentlemanracer.com/2012/07/motorcycle-rollercoaster.html Jul. 2012.

(Continued)

*Primary Examiner* — Kien Nguyen
(74) *Attorney, Agent, or Firm* — Fletcher Yoder, P.C.

(57) ABSTRACT

A motion simulator ride assembly includes a motion base and a rider support assembly positioned beneath and coupled to the motion base. The rider support assembly includes a plurality of rider support units, each rider support unit of the one or more rider support units having an inversion table having a surface that may abut a rider. The inversion table may rotate about an axis to transition between a loading configuration and a ride configuration and the ride configuration positions the rider in a substantially facedown position. Each rider support unit also includes a restraint system that may secure the rider onto the inversion table. The restraint system includes a first moveable restraint and a second moveable restraint that are each coupled to the inversion table and the first and second moveable restraints may move relative to the surface to move the first and second movable restraints from an unrestrained configuration to a restrained configuration. The motion simulator ride (Continued)

assembly also includes a display screen that may project a simulated environment. The display screen is positioned below the motion base.

20 Claims, 9 Drawing Sheets

(51) Int. Cl.
*A63G 7/00* (2006.01)
*A63G 31/08* (2006.01)
*A63G 31/14* (2006.01)
*G06T 19/00* (2011.01)

(58) Field of Classification Search
USPC .......... 472/59–61, 130, 137; 434/29, 55, 58
See application file for complete search history.

(56) References Cited

U.S. PATENT DOCUMENTS

| | | | |
|---|---|---|---|
| 6,126,552 A * | 10/2000 | Harrap | A63G 9/00 472/118 |
| 6,227,121 B1 | 5/2001 | Mares | |
| 6,909,543 B2 * | 6/2005 | Lantz | G03B 21/00 348/36 |
| 6,929,480 B2 | 8/2005 | Lee et al. | |
| 7,980,181 B2 * | 7/2011 | Heaslip | A63G 7/00 104/53 |
| 8,066,576 B2 | 11/2011 | Threlkel | |
| 8,453,576 B2 | 6/2013 | Roodenburg et al. | |
| 9,302,190 B1 | 4/2016 | Jennings | |
| 9,303,421 B1 | 4/2016 | Jennings | |
| 9,732,535 B2 | 8/2017 | Jennings | |
| 2005/0001466 A1 | 1/2005 | Zambelli et al. | |
| 2008/0051205 A1 | 2/2008 | Roodenburg et al. | |

FOREIGN PATENT DOCUMENTS

| | | |
|---|---|---|
| RU | 2264838 C1 | 11/2005 |
| WO | 2004073818 A1 | 9/2004 |
| WO | 2007055572 A1 | 5/2007 |

OTHER PUBLICATIONS

Canada's Wonderland debuts new Skyhawk ride this weekend | Toronto Star https://www.thestar.com/news/insight/2016/05/01/canadas-wonderland- . . . May 1, 2016.
MotoGP Motorcycle Racing; https://www.videoamusement.com/racing-simulators-rental/motogp-motorcycle-racing/ Accessed on Oct. 10, 2017.
Plane Rudder; http://www.start-flying.cominew%20site/controlling_aircraft.htm—Accessed on Oct. 10, 2017.
PCT/US2018/028944 Invitation to Pay Additional Fees dated Aug. 6, 2018.

* cited by examiner

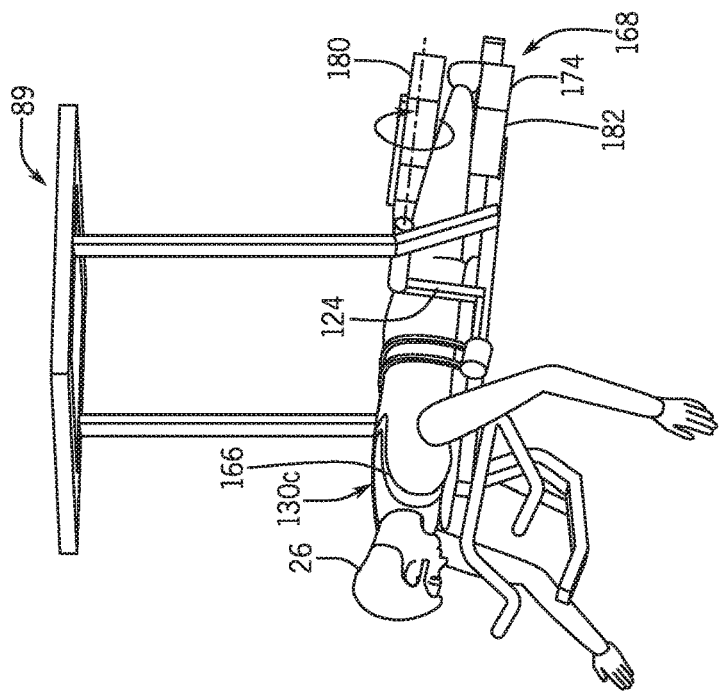
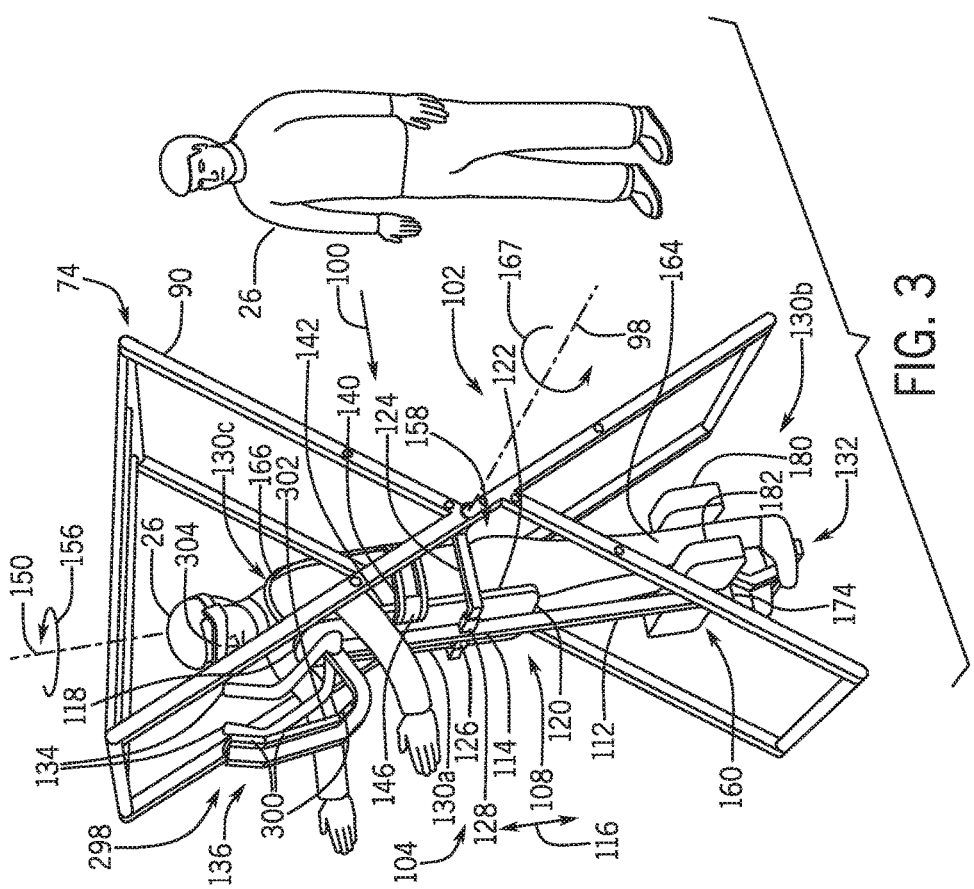
FIG. 4
FIG. 3

MOTION SIMULATION AMUSEMENT PARK ATTRACTION

CROSS-REFERENCE TO RELATED APPLICATIONS

This application claims the benefit of U.S. Provisional Application No. 62/489,895, filed Apr. 25, 2017, which is hereby incorporated by reference in its entirety.

BACKGROUND

The present disclosure relates generally to the field of amusement parks. More particularly, embodiments of the present disclosure relate to systems and methods for amusement park rides with motion simulation.

Various amusement rides have been created to provide passengers with unique motion and visual experiences. In one example, roller coasters and theme rides can be implemented with multi-passenger vehicles that travel along a fixed path. In addition to the excitement created by the speed or change in direction of the vehicles as they move along the path, the vehicles themselves may generate special effects, e.g., sound and/or motion effects. Although a repeat rider may be familiar with the general path of the ride, the special effects may create interest during second and subsequent rides. In another example, certain rides may be implemented with projection elements to create varying scenery and movement as the passenger vehicles travel along the path. However, it is now recognized that regardless of such enhancements to these passenger vehicle rides, the rider in the passenger vehicle may not feel immersed in the ride. For example, the rider generally is aware of being within a ride due, in part, to the confines of the vehicle itself. However, the rider may not be properly positioned within the ride to fully experience movements simulated by the ride. Accordingly, there is a need for an improved amusement ride vehicle that simulates certain experiences.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a motion simulator ride assembly includes a motion base and a rider support assembly positioned beneath and coupled to the motion base. The rider support assembly includes a plurality of rider support units, each rider support unit of the one or more rider support units having an inversion table having a surface that may abut a rider. The inversion table may rotate about an axis to transition between a loading configuration and a ride configuration and the ride configuration positions the rider in a substantially facedown position. Each rider support unit also includes a restraint system that may secure the rider onto the inversion table. The restraint system includes a first moveable restraint and a second moveable restraint that are each coupled to the inversion table and the first and second moveable restraints may move relative to the surface to move the first and second movable restraints from an unrestrained configuration to a restrained configuration. The motion simulator ride assembly also includes a display screen that may project a simulated environment. The display screen is positioned below the motion base.

In accordance with another embodiment, a rider support assembly includes one or more rider support units, each rider support unit of the one or more rider support units having a moveable base having a first end, a second end, and a surface extending between the first end and the second end. The moveable base may support and position a rider substantially horizontally in a facedown position. Each of the one or more rider support units also includes a restraint system having a torso restraint having a rotating restraint extending from the moveable base and that may move relative to the surface from an unrestrained configuration to a restrained configuration and a leg restraint positioned adjacent to the second end and having a fixed member and a moveable member spaced apart from the fixed member. The moveable member may move relative to the fixed member to move the leg restraint from an unrestrained configuration to a restrained configuration.

In accordance with another embodiment, a motion simulator ride assembly includes a rider support assembly having a plurality of rider support units, each rider support unit of the plurality of rider support units having a moveable base having a surface that may abut a rider. The moveable base may rotate about an axis of the rider support assembly from a substantially vertical loading configuration to a ride configuration in which the rider is positioned substantially horizontally in a facedown position. Each rider support of the plurality of rider supports also includes a restraint system that may secure the rider onto the rider support unit. The restraint system includes a torso restraint having a rotating restraint; and a leg restraint having a first member and a second member. The rotating restraint and the second member may move relative to the surface to transition the rotating restraint and the second member from an unrestrained configuration in the substantially vertical loading configuration to a restrained configuration in the ride configuration. The motion simulator ride assembly also includes a display screen that may project a simulated environment.

DRAWINGS

These and other features, aspects, and advantages of the present disclosure will become better understood when the following detailed description is read with reference to the accompanying drawings in which like characters represent like parts throughout the drawings, wherein:

FIG. 3 is perspective view of a rider support unit of the motion simulator ride assembly of FIG. 1 including a cross-frame inversion table and a restraint system having a movable back and leg restraint, whereby the cross-frame inversion table is in a loading configuration and the restraint system is in a restrained configuration, in accordance with an embodiment of the present disclosure;

FIG. 4 is perspective view of the rider support unit of FIG. 3, whereby the cross-frame inversion table rotates to position a rider of the motion simulator ride in a facedown position, in accordance with an embodiment of the present disclosure;

Figure 2:
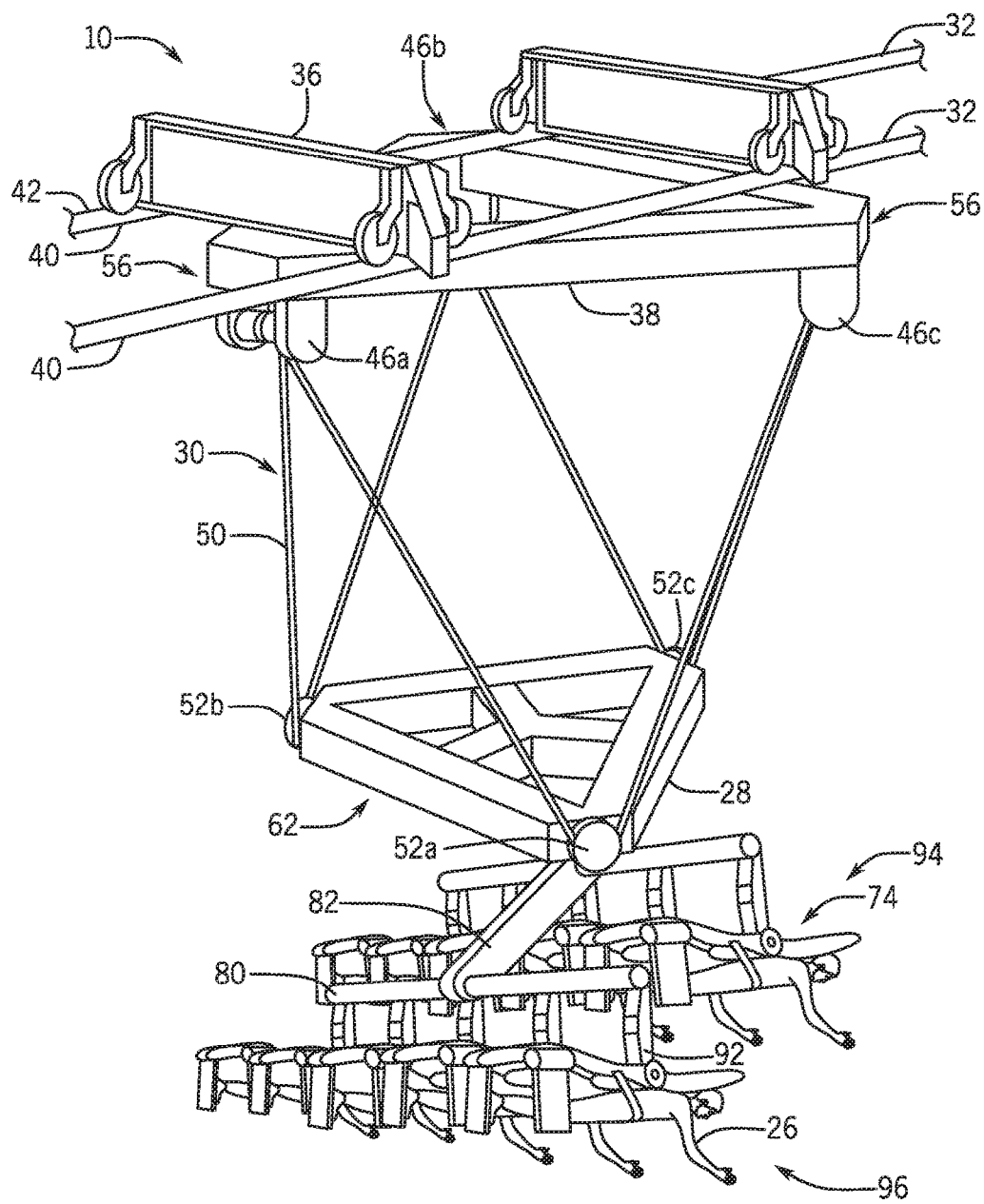
FIG. 2 is a perspective view of a motion simulator ride assembly having a cable suspension rig and bogie, in accordance with an embodiment of the present disclosure.
Figure 8:
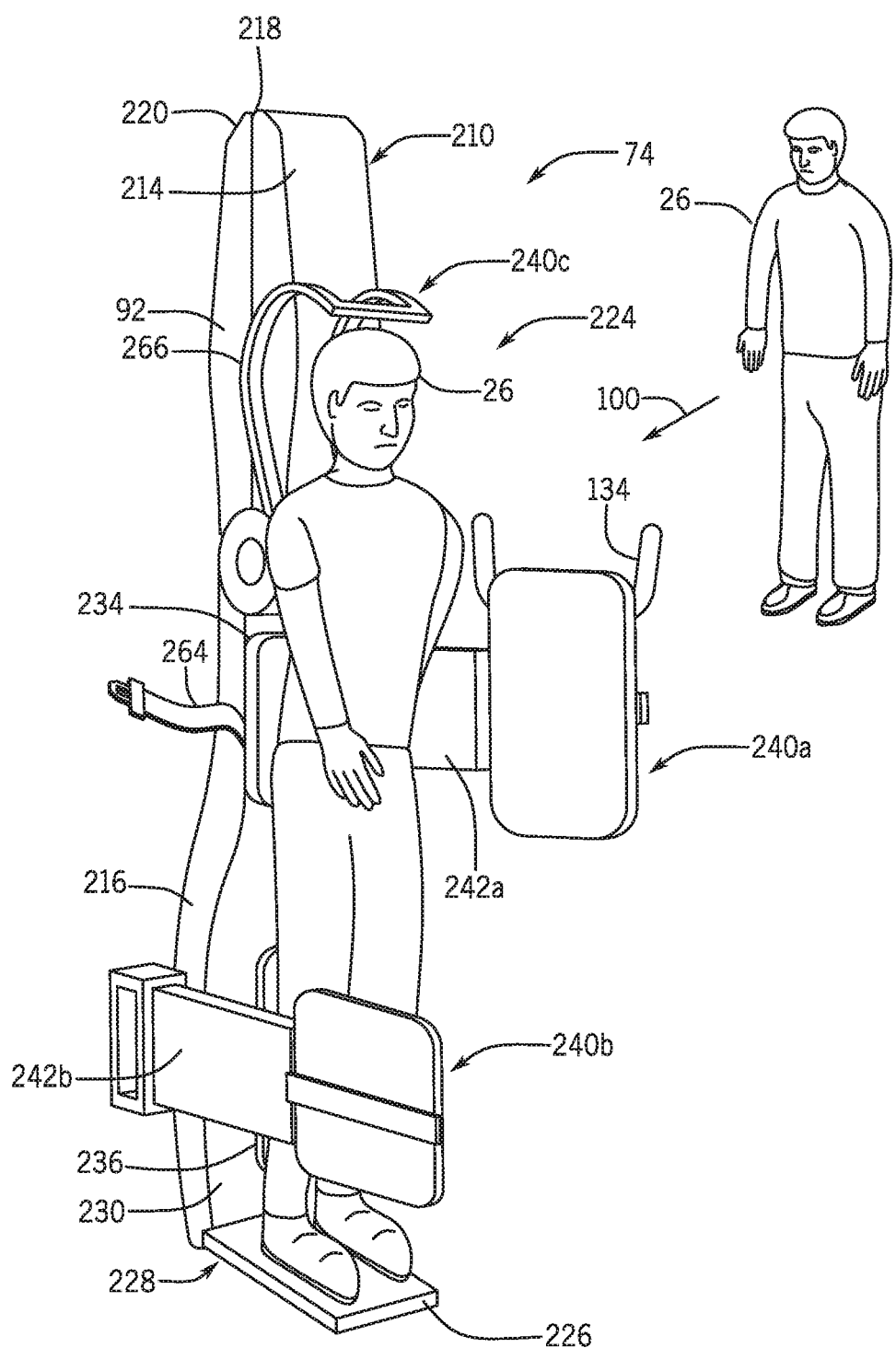
Figure 9:
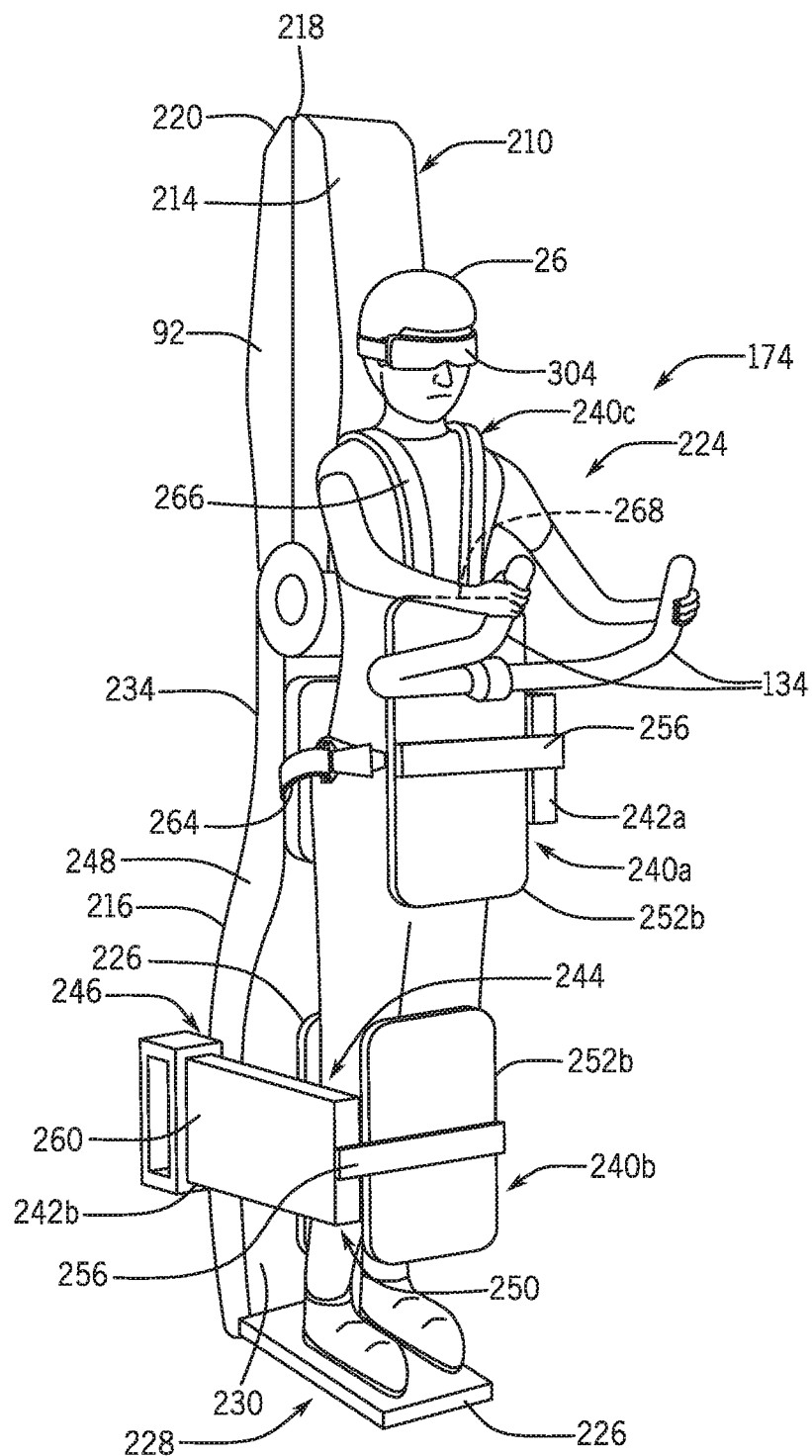
Figure 10:
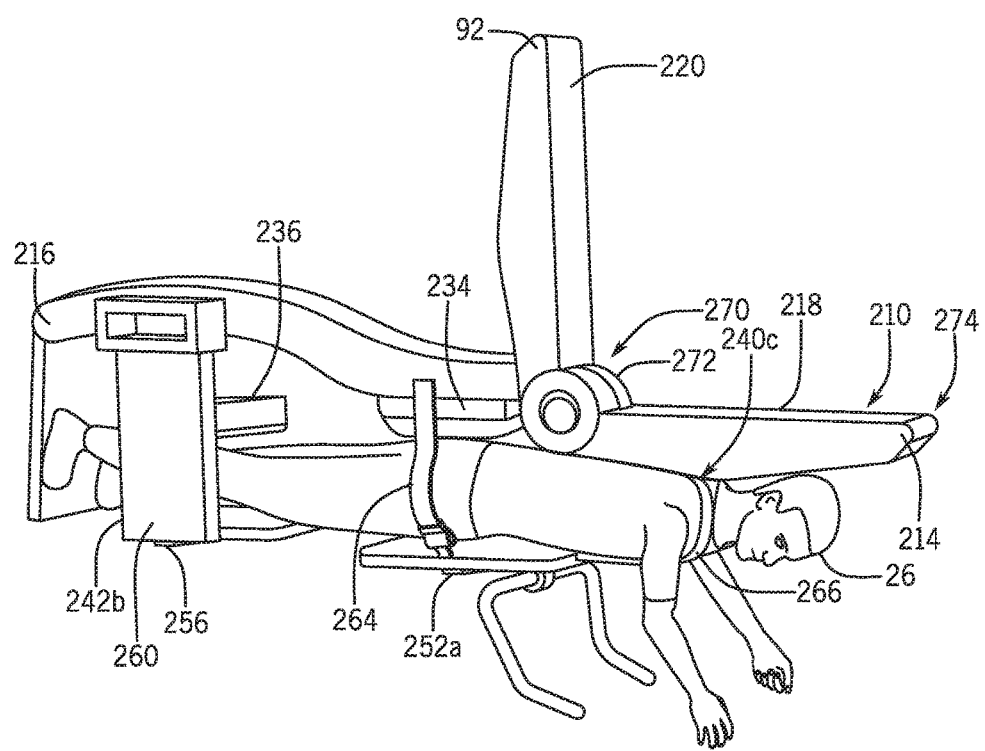
Figure 11:
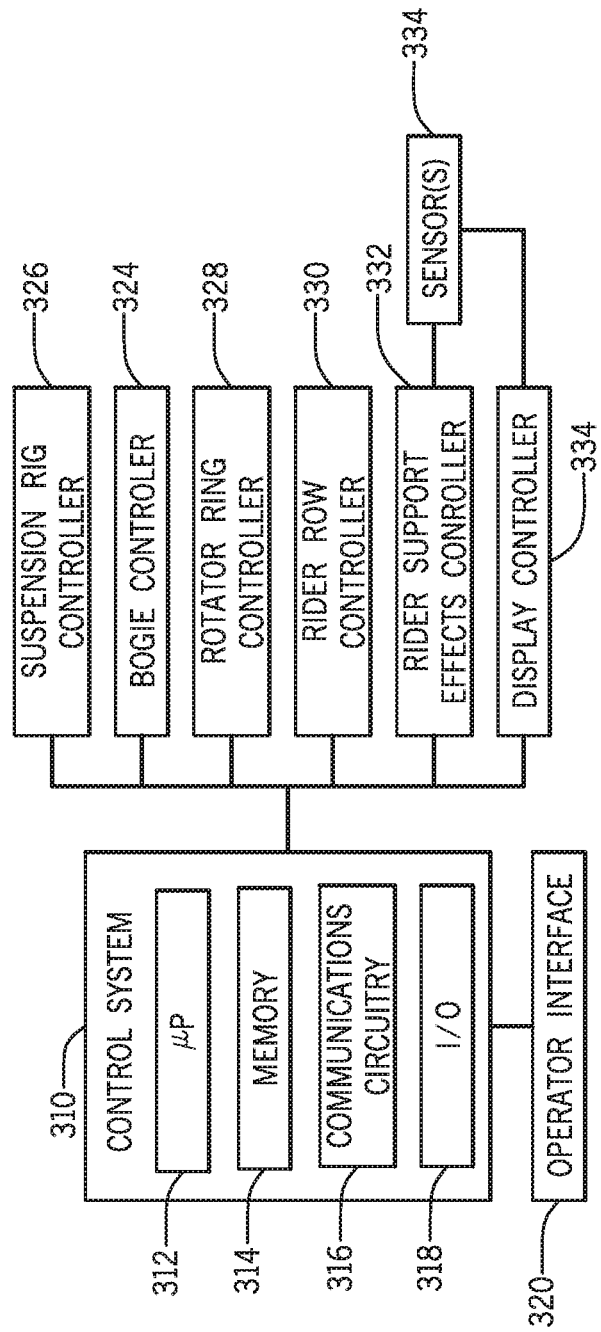

FIG. 8 is a perspective view of a rider support unit of the motion simulator ride assembly of FIG. 2 having an inversion table coupled to an extending arm of a rider support assembly and a restraint system having torso restraint and a leg restraint, whereby the inversion table is in a loading configuration and the restraint system is in an unrestrained configuration, in accordance with an embodiment of the present disclosure;

FIG. 9 is a perspective view of the rider support unit of FIG. 9, whereby the torso and leg restraints are in the restrained configuration;

FIG. 10 is perspective view of the rider support unit of FIG. 9, whereby the inversion table rotates to position the rider in a facedown position, in accordance with an embodiment of the present disclosure;

FIG. 11 is block diagram of a motion simulator ride control system in accordance with present techniques.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain existing motion simulator ride vehicles may not be suitable for simulating certain motions, such as the feeling of flight, gliding, or the like. For example, certain motion simulator ride vehicles may include walls that may separate a rider from a desired environment of a motion simulator ride and may block airflow during the ride. As such, the motion simulator ride vehicle may be unable to provide the rider the feeling of flying, gliding, or the like. In addition, the configuration of certain motion simulator ride vehicles may restrict arm and leg movement that may not allow the rider to feel realistic feedback from arm and leg movement to create an improved simulation of flying, for example.

Due to the configuration of certain motion simulator ride vehicles, a position of a display screen that displays a simulated environment during operation of the motion simulator ride may not be suitable for simulating the feeling of flight. For example, certain motion simulator rides may have a domed projection screen that displays the simulated environment positioned above the motion simulator ride vehicle. Therefore, it may be difficult to create a feeling of flying because the rider does not view the environment in a more natural and comfortable rider gaze position (e.g., generally downward) as one would be if they were flying, for example. Accordingly, provided herein is a motion simulator ride system having a rider support assembly that allows the rider to experience the feeling of flying. For example, the motion simulator ride system may include an actuatable rider support assembly that positions the rider to allow the rider to face downwards or with a generally natural gaze orientation during operation of the motion simulator ride. The motion simulator ride may also include visual effects devices (e.g., screens, headsets) that are positioned to account for, in one example, generally downward gaze positions. Accordingly, disclosed herein is a table-like rider support for use with the rider support assembly and which has rotational freedom to position the rider in a prone or prostrate position (e.g., facedown) to simulate the feeling of flight. Additionally, disclosed herein are restraint systems for use in conjunction with the table-like rider support and that comfortably restrain a rider as the rider support assembly is actuated in various directions.

The rider support assembly disclosed herein may be implemented without a dedicated enclosure for each individual ride vehicle (e.g., that separates a single ride vehicle from other vehicles in the ride). In this manner, although each vehicle may be configured to support a single rider (or, in certain embodiments, two or more riders), the ride may nonetheless accommodate multiple individual vehicles that simultaneously experience certain special effects (wind effects, visual effects, audio effects, water effects) in the ride. Accordingly, the immersive ride experience may be more efficiently provided to an entire group of riders. Further, such a configuration may permit enhanced ride throughput by allowing multiple riders at one time. The present techniques are in contrast to vehicle-based simulations in which the rider is separated from the environment by a totally or partially enclosed vehicle. While such vehicles may have generally wide fields of view via windows or transparent walls, the feeling of flight, for example, is reduced because the rider does not feel airflow during the ride and because the vehicle walls separate the rider from the environment. In addition, a rider in a vehicle does not feel realistic feedback from arm and leg movement to create an improved simulation of flying.

The rider support assembly may have certain features that enable the rider to have arm and leg movements that simulate flying. For example, the rider support assembly may include a rider support having a substantially slanted and/or horizontal configuration that allows the rider to be supported in a facedown position. For example, the rider support may allow the rider to be positioned with a portion of their front torso resting on a superior surface of the rider support. In this way, the rider may look down at the environment projected on the display screen positioned below the rider. By positioning the rider in a facedown position above the display screen, the rider may experience a sensation and feeling of flight, gliding, or the like. Additionally, the disclosed rider support assembly may allow the rider to experience sudden moments of positive and negative gravitational forces (e.g., g-forces) that enhance the sensation of riding or motorcycling, and provide a more pleasurable riding experience.

While the disclosed embodiments are generally described in the context of amusement park rides, it should be understood that the motion simulator ride as provided herein may also be used in other contexts. For example, the motion simulator ride may be used for sports training (e.g., gymnastics), or therapy purposes.

Figure 1:
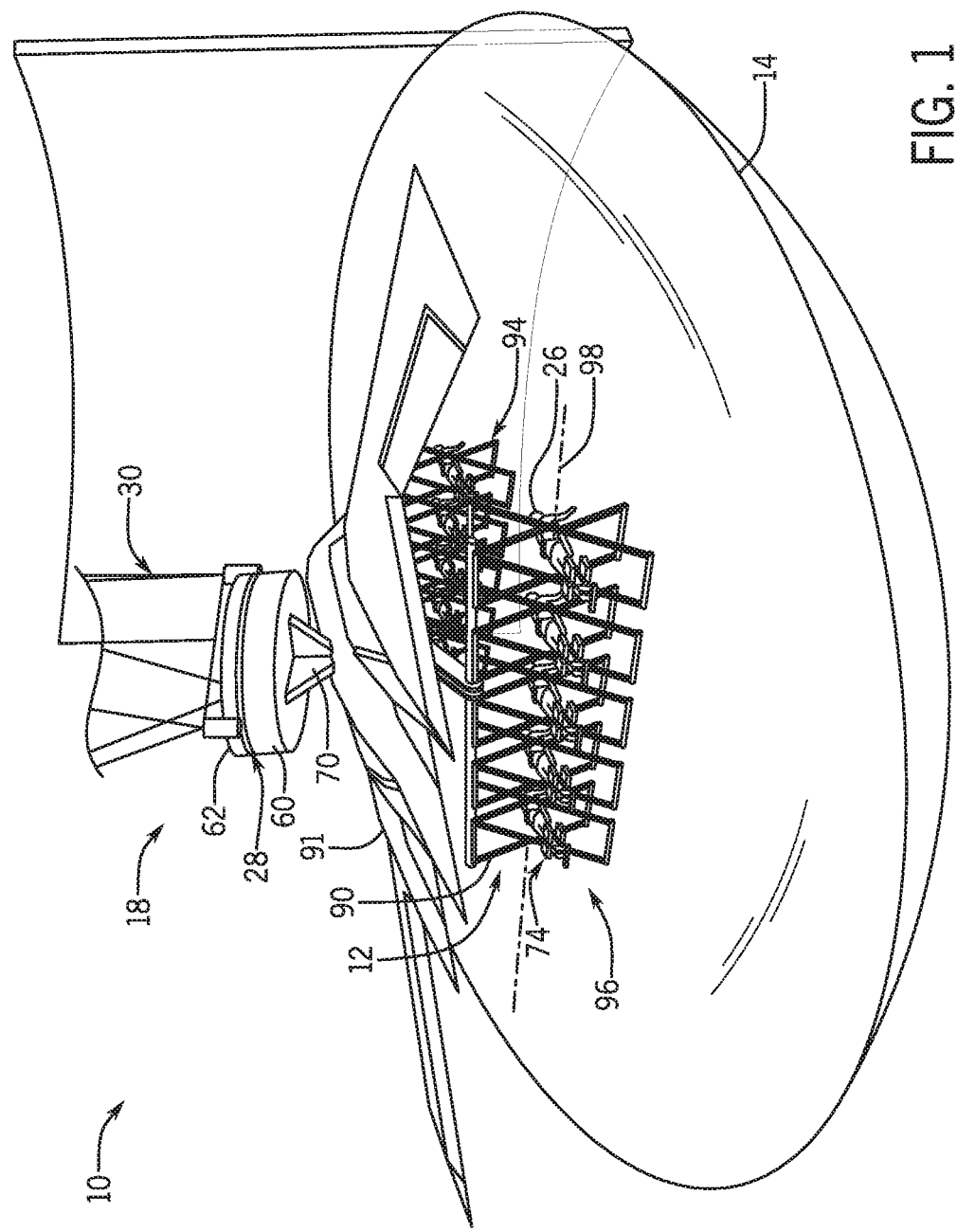
FIG. 1 is a perspective view of a motion simulator ride assembly in accordance with an embodiment of the present disclosure.

FIGS. 1 and 2 are perspective views of a motion simulator ride 10 including an embodiment of a rider support assembly 12 that may be used to position a rider above a display screen, e.g., a domed projection screen 14 (FIG. 1) or in conjunction with a headset or display positioned within the rider support assembly 12. The rider support assembly 12 may include, or be part of, a transport system 18 that supports and moves the rider support assembly 12 along a path of the motion simulator ride 10. The transport system 18 may include a gondola positioned above the rider support assembly 12 that facilitates loading and unloading of riders 26. Additionally, the transport system 18 may include a motion base 28 that attaches to the rider support assembly 12 and a cable suspension rig 30 that drives the motion base 28 to facilitate movement of the rider support assembly 12 during operation of the motion simulator ride 10. The motion base 28 may be suspended (e.g., from the cable suspension rig 30), and may in turn couple to or otherwise suspend the rider support assembly 12. The rider support assembly 12 may be an integral component of the motion base 28 or may be a separate structure that is attached to the motion base 28 by any suitable attachment technique (e.g., fasteners, cables, support beams, welding). In this manner, the rider support assembly 12 is actuated in response to actuation of the motion base to cause a variety of motion effects.

As illustrated by FIG. 2, in an embodiment, the transport system 18 is positioned along ride tracks 32. In operation, a bogie 36 of the transport system 18 travels along the ride tracks 32 to move the rider support assembly 12 along a ride path during the ride 10. The transport system 18 may include a bogie 36 having pinch wheels or other components that facilitate movement along the ride tracks 32. The bogie 36 may include pinch wheels or other components to facilitate movement along the ride tracks 32. The bogie 36 is coupled to a subframe 38 that includes the cable suspension rig 30. As depicted, subframe 38 and the cable suspension rig 30 are positioned on an underside 40 of the ride tracks 32. However, other arrangements are also contemplated. For example, certain components of the subframe 38 and/or the cable suspension rig 30 may be positioned on a topside 42 of the ride tracks 32 in other embodiments. The subframe 38 may include one or more cable control assemblies 46, e.g., cable control assemblies 46a, 46b, and 46c, connected via the subframe 38. Various components of the ride 10 may be coupled to a power source. In one embodiment, the ride components (e.g., the cable control assemblies 46, special effects controllers, motors) may draw power from the power source powering the bogie 36. The bogie 36, in turn, may be coupled to a power source via a cable. In one embodiment, the bogie 36 draws power from the tracks 32 via an electrical contact.

Each cable control assembly 46 (e.g., motorized winch system) is coupled to one or more cables 50 suspending the motion base 28. The motion base 28 includes cable connector elements 52a, 52b, and 52c (e.g., connectors, grippers, rings) configured to receive one or more cables 50. The cable connector elements 52 may be distributed about a perimeter of the motion base 28 along an upper surface or, in another embodiment, along a side of the motion base 28. The cables 50 are coupled to the motion base 28 and the cable control assemblies 46 (46a, 46b, 46c) such that movement of the motion base 28 may be generated by selective control of an amount of cable extending from the cable control assemblies 46 coupled to various cable connector elements 52 on the motion base 28. An individual cable control assembly 46 may include a winch, pulley, spooling system, motor and/or other cable mechanical controllers that are configured to change a distance between the cable control assembly 46 and the motion base 28 by, for example, spooling or unspooling the cable 50 such that an amount (or length) of cable extending from the cable control assembly 46 to the cable connector element 52 is changed. In one embodiment, the distance between the cable control assembly 46 and the motion base 28 is increased when the cable 50 is unspooled such that an amount of cable 50 extending from the cable control assembly 46 to the cable connector element 52 is increased. Because the motion base 28 is coupled to several cables 50 and associated cable control assemblies 46, the type of motion patterns generated by changing the configuration of various cables 50 may be complex.

The cable suspension rig 30, via control of the cable control assemblies 46 and under control of a control system (see FIG. 11), is capable of causing the motion base 28 to move in multiple degrees of freedom. Such motion may include pitch, roll, and heave as well as surge, sway, and yaw, either alone or in combination with one another. Accordingly, the motion base 28 may be configured to create all six degrees of freedom, depending on the implementation and arrangement of the cables 50, e.g., via different amounts, lengths, or portions of cable 50 spooled out. In a particular embodiment, as shown in FIGS. 2-4, the cable suspension rig 30 includes at least three cable control assemblies 46 arranged in a triangle formation with the cable control assemblies 46 positioned generally at each corner 56. Certain motion patterns may be created by manipulating the cable 50, e.g., by using a motor of the cable control assembly 46 to wind the cable 50 or to unwind the cable 50. Further, each individual cable control assembly 46 may have cables 50 coupled to one or more cable connector elements 52 on the motion base 28 to generate more complexity and variability of motion.

In one example, the motion base 28 may pitch (where the forward direction of the tracks 32 is considered the x-axis), when the unspooled portion of the cables 50 connected to cable connector element 52a and 52b is decreased and/or the unspooled portion of the cables 50 connected to cable connector element 52c is increased. The reverse pattern would create pitch towards the opposite direction. Further, forward pitch and left roll may be created by raising the cable connector element 52a relative to the cable connector element 52c, while the reverse of the pattern would generate reverse movement. In one embodiment, the cable suspension rig 30 is capable of producing 30 degree pitch or roll in the motion base 28. Heave may be generated by an up and down motion, created by simultaneous winding and subsequent releasing of all of the cables 50 to move the motion base 28 up and down. In another embodiment, the cable suspension rig 30 is capable of producing 18 ft. heave. Further, the heave motion may include a superimposed pitch or roll. Other combinations are also contemplated, and motion in any of the six degrees of freedom may be combined in series in a programmed pattern to create various types of flight or motion simulation experiences.

The transport system 18 may use other driving systems that do not include the cable suspension rig 30 or work in combination with the cable suspension rig 30 to drive the transport system 18. For example, in certain embodiments, the transport system 18 may include a robotic arm or a cantilevered arm that drives movement of the transport system 18 to provide the rider with the feeling of flight, gliding, or the like. Accordingly, the slightest movement of the transport system 18 may create new forces on the rider's body due, in part, to the distribution of gravitational forces. For example, the configuration of the rider support assembly 12 may allow the rider to be in a forward slant position and/or a prone/prostrate position. By positioning the rider in the forward slant or prone/prostrate position, the gravitation forces acting on the rider allow the ride 10 to provide a feeling of flying.

In certain embodiments, the motion base 28 may include a rotator ring 60 that is capable of complete or partial rotation, e.g., under control of a motor, relative to a motion base suspended support 62 to generate additional types of motion, as illustrated in FIG. 1. In one embodiment, the rotator ring 60 is coupled to a central rod that in turn is coupled to a motor that turns the rod to rotate the rotator ring 60.

In operation, motion of the motion base 28 is translated to riders 26, who are coupled to the rider support assembly 12 via a support 82 that in turn is coupled to the rider support assembly 12 including the one or more rider support units 74. The support 82 extends downwards and away from the tracks 32 (and the motion base 28) to suspend the rider support assembly 12 and, in turn, the rider support units 74. As shown in FIG. 2, the support 82 extends downwardly (e.g., in a direction away from the bogie 36) from the motion base suspended support 62 of the motion base 28. In embodiments in which the motion base 28 includes the rotator ring 60, the support 82 may be directly coupled to the rotator ring 60 such that rotation of the rotator ring 60 also rotates the support 82 and, in turn, the riders 26 secured in the rider support units 74, as illustrated in FIG. 1. In one embodiment, the riders 26 may face forward along the axis of forward movement along the ride tracks 32 as the bogie 36 moves to enhance a feeling of flying. However, in other embodiments, the riders 26 may be rotated during the ride 10 to face objects of interest or to enhance certain effects, such as being thrown sideways by an impact.

The support 82 is coupled to a base member 80 of the rider support assembly 12 via a support 82. In certain embodiments, the support 82 is configured to rotate relative to the support 82 to move the rider support units 74 about the axis of rotation. The support 82 may be coupled to additional base members 80 that include other rows of rider support units 74. The support 82 may be coupled to a motor to control the rotation of the support 82 relative to the motion base 28.

In the embodiment depicted in FIG. 2, the base member 80 extends along a multi-rider row and is attached to or forms part of the rider support units 74. In multi-rider embodiments, the base member 80 may extend from the support 82 to accommodate a plurality of rider support units 74 along its length (e.g., including any rider securing components associated with each rider support unit 74, such as restraints). In certain embodiments, the base member 80 may include a cross-frame 90 (e.g., see FIG. 1) or an extending arm 92 (see, FIG. 2) that couples the rider support units 74 to the base member 80, as illustrated in FIGS. 1 and 2.

The rider support units 74 are arranged in a manner that allows each rider 26 to have a desirable field of view of the environment projected by the display screen, such as the domed projection screen 14 positioned below the rider support assembly 12 or any other suitable projection screen (e.g., a display of a rider-worn headset). For example, in certain embodiments, the rider support assembly 12 may include an array (e.g., group) of 2-10 rider support units 74. However, the rider support assembly 12 may include any other suitable number of rider support units 74 that allow the rider 26 to have a positive ride experience.

As discussed herein, the disclosed rider support assembly 12 may provide the rider 26 of the motion simulator ride 10 with a feeling of flight, gliding, or the like by positioning the rider 26 in a prone position over a display screen (e.g., the domed projection screen 14 or other suitable display screen). Once the rider 26 is secured to the rider support assembly 12, a control system of the motion simulator ride 10 may instruct the transport system 18 to raise the rider support assembly 12 off the ground and transport the rider 26 over the domed projection screen 14 positioned beneath at least a portion of the rider support assembly 12, thereby suspending the rider 26 within the ride 10. The transport system 18, in combination with the rider support assembly 12, may facilitate movement of the rider support units 74 in a manner that allows the rider 26 to experience the feeling of flying, gliding, or the like. For example, in certain embodiments, the rider support assembly 12 allows the rider 26 to be positioned above and look down toward the domed projection screen 14 positioned below the rider support assembly 12. As the cable suspension rig 30 drives movement of the rider support assembly 12 and, therefore, movement of all associated rider support units 74, the airflow through the rider's body (e.g., arms and legs) may allow the rider 68 to experience the feeling of flight. The motion simulator ride 10 may also include a canopy 91 (FIG. 1) or other structure to shield the motion base 28 and other ride structures from rider view.

In one embodiment, the rider support assembly 12 includes multiple rows of rider support units 74. For example, as illustrated in FIGS. 1 and 2, the rider support assembly 12 includes a first row 94 (e.g. a front row) having a portion of the rider support units 74 and a second row 96 (e.g., a back row) having another portion of rider support units 74. In certain embodiments, the first row 94 may be positioned above or below the second row 96. That is, the first row 94 and the second row 96 may not be horizontally aligned. In one embodiment, the rider support assembly 12 may transition the first row 94 and the second row 96 between different alignments, for example, as a transition between loading and operating modes. During loading and unloading modes, the first row 94 may be below the second row 96 to facilitate mounting or demounting the rider support units 74 by the riders 26. After loading or unloading the riders 26 in the first row 94, the rider support assembly 12 may position the second row 96 below the first row 94 to facilitate mounting or demounting of the riders 26 from the second row 96. Additionally, in operation mode, the transport system 18 may move the rider support assembly 12 in a manner that transitions the alignment of the first row 94 and the second row 96 to simulate a desired motion that allows the riders 26 to experience the feeling of flight.

In other embodiments, the first row 94 and the second row 96 are at the same level such that the first row 94 and the second row 96 are substantially horizontally aligned (or positioned along the same horizontal plane). In one embodiment, the rows 94, 96 have the same number of rider support units 74. In other embodiments, the rows 94, 96 have a different number of rider support units 74. The rider support units 74 along each row 94, 96 may be in a staggered configuration or may be aligned. For example, the rider support units 74 in the row 94, 96 may be aligned along a centerline axis 98 of the row 94, 96. In other embodiments, at least a portion of the rider support units 74 are offset from the centerline axis 98 such that the rider support units 74 along the row 94, 96 are in a staggered configuration.

Each individual rider support unit 74 may include various features to secure the rider 26 to the rider support assembly 12. For example, FIGS. 3 and 4 illustrate an embodiment of the rider support unit 74 that is configured to, during ride operation, position the rider 26 in a prone or prostrate position in a manner that allows the rider 26 to experience the feeling of flying, gliding, or the like. FIG. 3 shows the rider support unit 74 in a loading configuration in which the angle or position of the rider support unit 74 is configured to permit walk-on loading. That is, rather than a support that is fixed in the prone position, the rider support unit 74 is configured to adjust between an upright position in the loading configuration (FIG. 3) and a prone position in the ride configuration. In the ride configuration of FIG. 3, the rider 26 approaches the rider support unit 74 in a direction 100 from a loading side 102 that is generally free of obstructions, which are generally positioned at a side 104 of the rider support unit 74. The rider support unit 74 may include various actuatable restraints that, in an unconstrained or loading configuration, are positioned to allow the rider 24 to walk on to the rider support unit 74.

Each individual rider support unit 74 includes an inversion table 108 that supports a frontal side 110 of the rider 26 within the motion simulator ride 10. For example, the cross-frame inversion table 108 provides a support onto which the rider 26 may walk onto during loading of the motion simulator ride 10. The disclosed rider support unit 74 may allow the rider 26 to be positioned face-down and substantially horizontal (e.g., laying on their stomach (frontal side 110)) when in the ride configuration of FIG. 4. In certain embodiments, the cross-frame inversion table 108 may be formed from adjustable components. For example, the cross-frame inversion table 108 includes a support beam 112 having a torso plate 114. The torso plate 114 may slide up and down the support beam 112, as shown by arrow 116, to adjust a position of the torso plate 114 relative to the frontal side 110 of the rider 26 to accommodate various rider sizes. When in position, the torso plate 114 is between the rider's shoulders and his/her knees. For example, in the illustrated embodiment, the torso plate 114 is positioned such that a proximal end 118 of the torso plate 114 is aligned with the rider's shoulders and a distal end 120 of the torso plate 114 is positioned adjacent to the rider's hips. However, in certain embodiments, the torso plate 114 may extend below the rider's hips such that the distal end 120 is adjacent to the rider's knees. The torso plate 114 may be configured to provide special effect features such as sound and vibration. This may provide the rider 26 with a realistic feeling of flying at various speeds with a screen projection (e.g., the domed projection screen 14) a desired environment for the rider 26. The torso plate 114 may also include features that provide the rider 26 comfort. For example, a superior surface 122 (e.g., the surface abutting the rider 26) of the torso plate 114 may include contours such that the superior surface 122 conforms to a shape of a rider 26.

The support beam couples the inversion table 108 to the cross-frame 90 of the rider support unit 74. For example, a pair of coupling members 124 extending between the cross-frame 90 and the support beam 112 secure the inversion table 108 to the cross-frame 90. In the illustrated embodiment, the coupling members 124 have a "Z" shape configuration. This "Z" shape facilitates a coupling of the support beam 112 to the cross-frame 90 such that the inversion table 108 is spaced apart from the cross-frame 90. The spaced apart configuration between the inversion table 108 and the cross-frame 90 may provide rider comfort by allowing the rider 26 to position their arms between the cross-frame 90 and the inversion table 108. However, the coupling members 124 may have any other suitable configuration that facilitates coupling and securing the inversion table 108 to the cross-frame 90. The coupling members 124 may include extensions 126 that may be inserted into a complementary coupling member on the cross-frame 90 and support beam 112, thereby coupling the inversion table 108 to the cross-frame 90. Fasteners (e.g., bolts, screws), welding, or any other suitable coupling mechanism and combinations thereof, may be used to secure the inversion table 108 to the cross-frame 90. In addition to securing the inversion table 108 to the cross-frame 90, the coupling members 124 may also secure a portion of the torso plate 114 to the support beam 112. For example, fasteners 128, or any other suitable coupling mechanism, may be used to secure the torso plate 114 to the support beam 112 (e.g., via the extensions 126).

In addition to the torso plate 114, the inversion table 108 includes a restraint system 130, e.g., one or more of a back restraint 130a, a leg restraint 130b, and a shoulder restraint 130c that secures the rider 26 to the inversion table 108 before the motion simulator ride 10 begins, as discussed in further detail below. In the embodiments illustrated in FIGS. 3 and 4, the restraint 130a and 130c are positioned on the torso plate 114 and the restraint 130b is positioned on the support beam 112 adjacent to a foot-end 132 of the inversion table 108.

A pair of handle bars 134 may extend from the inversion table 108 at a head end 136. Once the rider 26 is positioned on the inversion table 108, the rider 26 may grab the handle bars 134. The handle bars 134 radially extend away from the inversion table 108 in an upward direction. However, in certain embodiments, the handle bars 134 may extend away from inversion table 108 in a downward direction. The handle bars 134 may allow the rider 26 to rest his/her arms during operation of the ride 10. The handle bars 134 may be adjustable to accommodate various rider sizes and rider comfort preferences. In addition to providing support for the rider 26, the handle bars 134 may allow the rider 26 to experience certain motions associated with flying, gliding, parachuting, or the like. For example, during operation of the motion simulator ride 10, the rider 26 may move the handle bars 134 in a manner that allows the rider 26 to feel as if he/she is flying, parachuting, gliding, or the like. In certain embodiments, the handle bars 134 may have control features that may allow the rider 26 to move the inversion table 108 to enhance the feeling of flying. For example, the handle bars 134 may include gears that simulate acceleration and provide the feeling of speed to the rider 26 during operation of the ride 10. Additionally, the handle bars 134 may allow the rider 26 to control rotation of the inversion table 108 within the cross-frame 90, thereby allowing the rider 26 to be positioned substantially vertical, at an incline (FIG. 3), or substantially horizontal (e.g., FIG. 4) relative to the cross-frame 90. The inversion table 108 may be configured to rotate 360 degrees in either direction within the cross-frame 90 to provide rotational freedom to the rider 26, thereby allowing the rider 26 to move within the rider support unit 74 and experience the feeling of flight. Present embodiments may also include sensing mechanisms or haptic feedback on the handle bars 134 that communicate with a controller of the ride 10 to facilitate incorporation of movement into feedback for a virtual reality experience (e.g., virtual hands may move in video being displayed for the rider 26 based on feedback from the handle bars 134).

Figure 5:
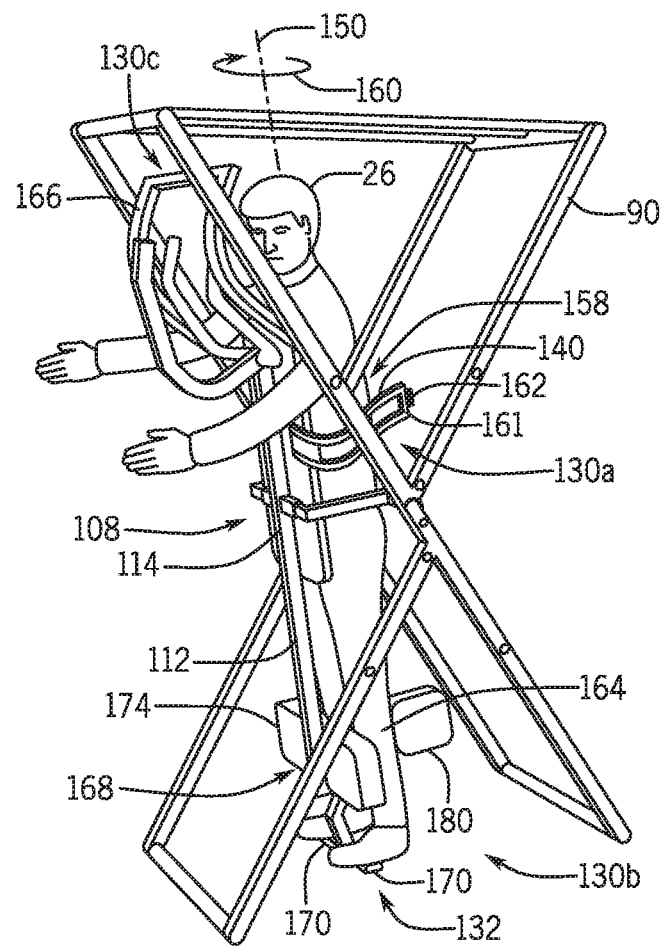
FIG. 5 is perspective view of the rider support unit of FIG. 3, whereby the restraint system is in an unrestrained configuration.

As discussed herein, the rider support unit 74 includes the rider restraint system 130 to secure the rider 26 on the rider support unit 74 during operation of the ride 10. The rider restraint system 130 includes the back restraint 130a, the leg restraint 130b, and the shoulder restraint 130c. The back restraint 130a may be implemented as a rotating restraint 140 positioned on and extending from an edge 142 of the torso plate 114 or other suitably-positioned structure of the inversion table 108. An attachment point 146 of the rotating restraint 140 is positioned such that when the rider 26 is properly positioned on the inversion table 108 the rotating restraint 140 is at a lower back (e.g., waist) of the rider 26. The back restraint 130a may include additional rotating restraints positioned along the torso plate 114, e.g., a rotating restraint may also be positioned underneath the rider's arms and rest against the rider's upper back. When actuated (e.g., electronically or manually), the rotating restraint 140 rotates about an axis 150 to move from an unrestrained configuration (FIG. 5) to a restrained configuration (FIG. 3) and secure the rider 26. For example, the rotating restraint 140 moves toward the rider 26 in a direction 156 to rest on a dorsal side 158 of the rider 26 (e.g., the rider's back) when the rotating restraint 140 is in the restrained configuration, as illustrated in FIGS. 3 and 4. To move from the restrained to the unrestrained configuration (e.g., at the completion of the ride 10), the rotating restraint 140 moves away from the rider 26 in a direction 160, as illustrated in FIG. 5.

In the restrained configuration, shown in FIGS. 3 and 4, the rotating restraint 140 may extend across all or a portion of the dorsal side 158 of the rider 26. A coupling end 161 (e.g., free end) of the rotating restraint 140 includes an attachment feature 162 (e.g., a buckle, protrusion, recess, or any other suitable attachment feature) that couples to a complementary attachment feature on the inversion table 108 to secure rider 26 to the ride support unit 74. For example, the inversion table 108 may include a complementary attachment feature on a side of the inversion table 108 that is substantially opposite the side having the attachment point 146 of the rotating restraint 140. In certain embodiments, the back restraint 130a may include a harness (e.g., a 5-point harness) rather than the rotating restraint 140 that secures the rider 26 to the inversion table 108. The rotating restraint 140 may be adjustable to accommodate riders of various shapes and sizes.

In addition to the back restraint 130a, the shoulder restraint 130c provides additional support to the rider's torso to secure the rider 26 in the rider support unit 74. Similar to the back restraint 130a, the shoulder restraint 130c includes a rotating bar 166 coupled to the proximal end 118 of torso plate 114 that rotates relative to the centerline axis 98 to move the shoulder restraint 130c from the restrained configuration to the unrestrained configuration. For example, the rotating bar 166 rotates in a direction 167 to move the shoulder restraint 130c away from the rider 26 and toward the proximal end 118 of the torso plate 114 to transition from the restrained configuration to the unrestrained configuration (see FIG. 5). Conversely, the rotating bar 166 rotates in a direction substantially opposite the direction 167 to move the shoulder restraint 130c away from the proximal end 118 and toward the rider 26 to transition from the unrestrained configuration (see FIG. 5) to the restrained configuration. In the restrained configuration, the rotating bar 166 abuts the rider's shoulders and extends along a portion of the rider's back torso, thereby securing the rider 26 within the rider support unit 74.

Figure 6:
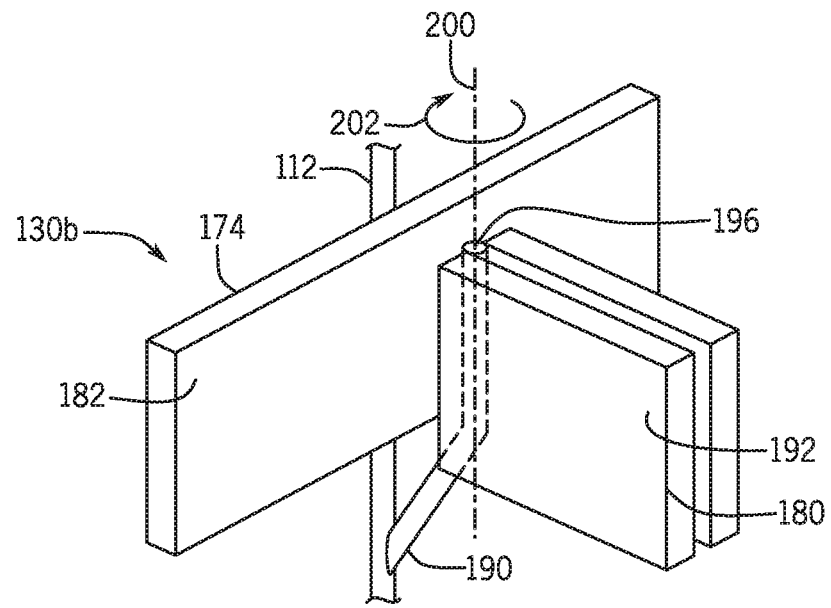
FIG. 6 is a perspective view of the leg restraint of the rider support unit of FIG. 1 in the unrestrained configuration, in accordance with an embodiment of the present disclosure.

As discussed above, the restraint system 130 includes the leg restraint 130b that also secures the rider 26 to the rider support unit 74. The leg restraint 130b holds legs 164 of the rider 26 in a desired position. The leg restraint 130b includes a pair of arms 168 radially extending away from each side of the support beam 112 adjacent to a foot rest 170 at the foot end 132 of the inversion table 108. Each pair of arms 168 includes a fixed member 174 and a movable member 180. The fixed member 174 is positioned in front of the movable member 180 such that when the rider 26 is positioned on the inversion table 108, a front side of the legs 164 of the rider 26 abut a surface 182 of the fixed member 174. The moveable member 180 of the leg restraint 130b is coupled to an extension 190 that extends from the support beam 112 such that the movable member 180 is positioned in behind the fixed member 174, as shown in FIG. 6. Once loaded onto the ride 10, the rider 26 may position each leg on a respective inner side 192 of the movable member 180. That is, the moveable member 180 is positioned between the legs 164 of the rider 26.

The moveable member 180 may move from an unrestrained configuration to a restrained configuration. FIG. 6 illustrates an embodiment of the movable member 180 of the leg restraint 130b in the unrestrained configuration. In the unrestrained configuration, the moveable member 180 may be positioned in a manner that does not interfere with loading of the rider 26. For example, the movable member 180 may be positioned essentially orthogonal to the fixed member 174 in the unrestrained configuration. To move to between the restrained and unstrained configurations, the movable member 180 may pivot at a pivoting joint 196 attached to the extension 190.

The pivoting joint 196 allows the movable member 180 to rotate relative to the extension 190 and the fixed member 174 to move the movable member 180 between the unrestrained and restrained configurations. Folding back the movable member 180 away from the fixed member 174 and the support beam 112 may enable the rider 26 to walk onto the inversion table 108 without having to raise their legs 164 over the moveable member 180 to avoid the moveable member 180 and/or to insert their legs 164 between the members 174, 180.

The rider 26 may position their legs 164 on the fixed member 174 after loading the rider support unit 74 and abutting their front torso against the superior surface 122 of the torso plate 114. For example, when properly positioned on the inversion table 108, the forward facing portion of the rider's legs 164 between the knee and the ankle abut the surface 182 of the fixed member 174. Once properly positioned, the movable member 180 may be actuated to move from the unrestrained configuration (FIGS. 5 and 6) to the restrained configuration, as shown in FIGS. 3 and 4. For example, the moveable members 180 of the leg restraint 130b may move toward the fixed member 174 such that a portion of the rider's leg 164 is between the fixed member 174 and the moveable member 180. That is, the movable member 180 may move in a butterfly-like motion when actuated to move between unrestrained and restrained configurations. When moving from the unrestrained configuration to the restrained configuration, the movable member 180 may rotate about an axis 200 to move the movable member 180 toward the fixed member 174, as shown by arrow 202 (see FIG. 6). In the restrained configuration, the moveable member 180 extends away from the extension 190 in a manner similar to the fixed member 174. As such, the moveable member 180 is essentially parallel to the fixed member 174 in the restrained configuration. However, other angles may apply depending on passenger size. The members 174, 180 secure a portion of the rider 26 to the inversion table 108 by sandwiching a portion of the legs 164 of the rider 26 between the members 174, 180. In this way, the members 174, 180 hold the legs 164 of the rider 26 in place during operation of the ride 10.

Figure 7:
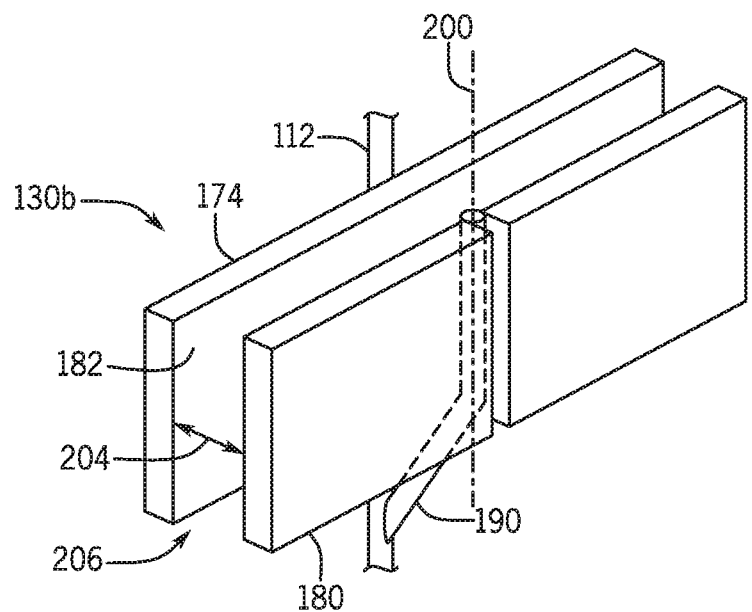
FIG. 7 is a perspective view of the leg restraint of FIG. 6 in the restrained configuration, in accordance with an embodiment of the present disclosure.

In the restrained configuration, the members 174, 180 of the leg restraint 130b are spaced apart a distance 204, thereby forming a gap 206 sized to fit a portion of the rider's legs 164, as illustrated in FIG. 7. To accommodate various shapes and sizes of the rider 26, the distance 204 may be adjusted by moving the movable member 180 toward or away from the fixed member 174. As such, the legs 164 of the rider 26 may be secured and held in place during operation of the ride 10. The distance 204 between the members 174, 180 may be adjusted automatically (e.g., via a controller) or manually by an operator of the ride 10.

In some embodiments, both of the members 174, 180 of the leg restraint 130b are actuated. For example, both the members 174, 180 may be actuated in a butterfly-like motion to sandwich about the rider's legs 164 and hold them in place for the ride 10. In these particular embodiments, the members 174, 180 move in opposite directions toward one another to position the members 174, 180 in the restrained configuration, and away from one another to position the members 174, 180 in the unrestrained configuration.

The rider support unit 74 may include other restraint and rider support unit configurations. FIGS. 8 and 9 illustrate an embodiment of the rider support unit 74 having movable base 210 onto which the rider 26 is secured before operation of the ride 10 and provides the rider 26 with the feeling of flight. FIG. 8 shows the rider support unit 74 in the unrestrained or loading configuration, and FIG. 9 shows the rider support unit 74 in the restrained configuration. The movable base 210 includes a first portion 214 and a second portion 216 that are each coupled to the extending arm 92. The movable base 210 is positioned substantially vertical such that a back surface 218 of the first portion 214 abuts a surface 220 of the extending arm 92. The rider 26 approaches the rider support unit 74 in the direction 100 from a side 224 (e.g., loading/unloading side) of the rider support unit 74. A platform 226 positioned at a foot end 228 of movable base 210 supports the rider 26 when loading the ride 10. The platform 226 extends away from a front surface 230 of the moveable base 210 such that when the rider 26 approaches the rider support unit 74, the rider 26 may step onto the platform 226. In certain embodiments, the platform 226 may slide up or down along the movable base 210 to adjust a position of the platform 226 relative to the foot end 228 to accommodate various sizes (e.g., height) of riders.

The movable base 210 includes various features that secure and provide comfort to the rider 26 during operation of the motion simulator ride 10. When properly positioned in the rider support unit 74, the rider 26 faces away from the front surface 230 of the movable base 210. Accordingly, the moveable base 210 may include a padding (e.g., a cushion) along at least a portion of the front surface 230 to provide rider comfort. For example, in the illustrated embodiment, the moveable base 210 include a back pad 234 onto which the rider 26 may rest at least a portion of his/her dorsal side against. In addition to the back pad 234, the moveable base 210 may include a leg pad 236 onto which the rider 26 may rest his/her calves. The pads 234, 236 may be fixed onto or moveable relative to the moveable base 210. For example, the pads 234, 236 may slide up or down along the moveable base 210 to adjust a position of the pads 234, 236 relative to the rider's dorsal side based on rider preference and comfort level The movable base 210 includes a rotatable restraint system 240, e.g., front torso restraint 240a, front leg restraint 240b, and a shoulder restraint 240c that, when actuated, secure the rider 26 within the rider support unit 74. The restraint system 240 includes a fixed restraint arm 242, e.g., torso fixed restraint arm 242a and leg fixed restraint arm 242b, positioned essentially orthogonal and attached to a respective side 248 of the moveable base 210 via a first end 246. For example, in the illustrated embodiment, the leg fixed restraint arm 242b is attached to the side 248 of the moveable base 210 that is opposite the side where the torso fixed restraint arm 242a is attached. However, in certain embodiments, the fixed restraint arms 242a, 242b are attached on the same side 48 of the moveable base 210. The fixed restraint arm 242 extends away from the front surface 230 of the moveable base 210 in a direction toward the side 224 in a manner that when the rider 26 is properly positioned within the ride support unit 74, an inner surface 244 of the fixed restraint arm 242 faces and may be in contact with the rider 26. A second end 250 of the fixed restraint arm is coupled to a respective rotating member 252, e.g., torso rotating member 252a and leg rotating member 252b, of the rotatable restraint system 240 via a respective pivoting joint 256. In the unrestrained configuration, the rotating members 252 are positioned in-line or parallel to the fixed restraint arm 242, as shown in FIG. 8. In other embodiments, the rotating members 252 extend away from an outer side surface 260 of the fixed restraint 242.

After loading and proper positioning of the rider 26 within the rider support unit 74, the rotating members 252 move about the pivoting joint 256 toward the rider 26 such that the rotating members 252 are essentially orthogonal to and extend away from the inner surface 244 of the fixed restraint arm 242. In this way, the rotating members 252 are positioned in front of the rider 26 (e.g., on a frontal side of the rider 26), thereby blocking the rider 26 from exiting the rider support unit 74. The rotating restraint system 240 may also include a strap 264 fixedly attached to the moveable base 210 and removably attached to the torso rotating member 252a, as illustrated in FIG. 9. The strap 264 in combination with the rotating member 252a, may secure the rider's torso and mitigate shifting of the rider 26 within the rider support unit 74 during operation. In certain embodiments, the rotating member 252b may also be attached to a respective strap to secure the rider 26 within the rider support unit 74. As discussed above, the platform 226 may slide up and down the moveable base 210. Accordingly, depending on a height of the rider 26, the platform 226 may slide up or down the moveable base 210 to position the rider 26 such that the torso rotating member 252a is positioned adjacent to hips and abdomen of the rider 26 and the leg rotating member 252b is positioned adjacent to shins and knees of the rider 26. In this way, the rotating restraint system 240 may secure the rider 26 to the rider support unit 74 during operation of the ride 10.

The shoulder restraint 240c provides additional support to the rider's torso similar to the shoulder restraint 130c discussed above with reference to FIGS. 3-5. The shoulder restraint 240c includes a rotating bar 266 coupled to the first portion 214 of the movable base 210. The rotating bar 266 rotates relative to the first portion 214 to transition the shoulder restraint 240c from the unrestrained configuration (see FIG. 8) to the restrained configuration (see FIG. 9). For example, the rotating bar 266 rotates away from the first portion 214 and toward the torso restraint 240b to transition from the unrestrained configuration to the restrained configuration (see FIG. 9). Conversely, the rotating bar 266 rotates away from the torso restraint 240a and toward the first portion 241 of the moveable base 210 to transition from the restrained configuration (see FIG. 9) to the unrestrained configuration (see FIG. 8). In the restrained configuration, the rotating bar 266 abuts the rider's shoulders and extends along a portion of the rider's front torso, thereby securing the rider 26, in combination with the restraints 240a, 240b, within the rider support unit 74.

In certain embodiments, one or both of the rotating members 252a, 252b may be configured to provide special effect features such as sound and vibration to provide the rider 26 with a realistic feeling of flying over various environments. In one embodiment, the torso rotating member 252a includes the handle bars 134 extending from an outer surface 268, as shown in FIG. 9. The torso rotating member 252a may also include a display (e.g., VR docking station and VR screen) that projects the desired environment to allow the rider 26 to experience the feeling of flight.

As discussed herein, the rider support unit 74 allows the rider to experience the feeling of flight by positioning the rider 26 facedown in a prone or prostrate position. Accordingly, the rider support unit 74 includes features that allow movement of the moveable base 210 from a substantially vertical position (e.g., loading position) to a substantially horizontal position (e.g., flying configuration) to simulate the feeling of flight. For example, FIG. 10 illustrates an embodiment of the moveable base 210 in the flying configuration. As illustrated, the moveable base 210 is positioned essentially orthogonal to the extending arm 92. An end 270 of the extending arm 92 includes an attachment joint 272 configured to allow movement of the moveable base 210 relative to the extending arm 92. For example, the movable base 210 may pivot at the attachment joint 272 to move the moveable base 210 away from the surface 220 of the extending arm 92 and increase an angle between the extending arm 92 and the first portion 214 of the moveable base 210, thereby positioning the rider 26 in a prone or prostrate position in a manner similar to flying. In certain embodiments, the moveable base 210 may continue to pivot at the attachment joint 272 such that the motion base 210 is inverted substantially vertical. For example, when the motion base 210 is inverted substantially vertical, the foot end 228 is positioned adjacent to the extending arm 92 and the head end 274 of the moveable base 210 positioned away from the extending arm 92. The rotational freedom of the moveable base 210 may allow the rider 26 to experience the feeling of flight by allowing the rider 26 to experience flying in various directions.

While in the flying configuration, the rotatable restraint system 240 provides support to and secures the frontal side of the rider 26. In certain embodiments, the moveable base 210 may include additional restraints, for example, a harness that straps the rider 26 to the moveable base 210 to secure and mitigate shifting of the rider 26 during operation of the ride 10. In one embodiment, the platform 226 may include foot inserts or straps that secure the rider's feet to the platform 226.

As discussed herein, the rider support unit 74 provides the rider 26 with a feeling of flight by positioning the rider 26 facedown on the rider support unit 74, thereby allowing the rider 26 to assume a position that allows the rider 26 to view a simulated environment projected below the rider support unit 74. As discussed herein, the ride 10 may include a domed projection screen 14 below the rider support assembly 12 (e.g., FIG. 1). However, in other embodiments, the display screen may be omitted or supplemented with a display screen on the rider support unit 74. For example, in one embodiment, the display screen may be a virtual reality (VR) screen that is part of a virtual reality (VR) docking station supporting a virtual reality system that simulates a desired environment to the rider 26. For example, returning to FIG. 3, the rider support unit 74 includes a VR headset 298 that may be used to project the simulated environment to the rider 26. The VR head set 298 includes a VR docking station 300 disposed at the head end 136 adjacent to the proximal end 118 of the torso plate 114 of the rider support unit 74 such that a VR screen 302 is positioned in the field of view of the rider 26 when facing down (e.g., below the rider 26 or in front of the rider's head). For example, in the illustrated embodiments, the VR docking station 300 and the VR screen 302 are disposed between the handle bars 134 of the rider support unit 74. The VR docking station 300 and the VR screen 302 on the rider support assembly 12 projects the environment to each individual rider 26. The VR screen 302 is communicatively coupled to a control system of the motion simulator ride 10 that provides instructions that enable each VR screen 302 to display the simulated environment for each rider 26. The rider 26 may wear 3D eyewear (e.g., head gear 304 as shown in FIGS. 3 and 9, glasses, goggles, headband) during operation of the motion simulator ride 10 to experience the feeling of being in the simulated environment. The 3D eyewear may be wireless or coupled to the VR docking station 300 via a cabled connection. The rider support unit 74 may include a tether, e.g., coupled to the inversion table 108 or movable base 210 that couples to and secures the 3D eyewear to the rider support unit 74, thereby mitigating separation of the 3D eyewear from the rider 26 during operation of the ride 10.

The VR docking station 300 may include an adjustable feature that allows each rider 26 to adjust the screen to a setting that is suitable for viewing the projected environment. For example, the adjustable feature may allow the rider 26 to adjust a distance between the screen 302 and the rider 26. In certain embodiments, the adjustable feature may allow the rider 26 to tilt (e.g., incline) the screen 302 such that viewing is enhanced for each individual rider 26. The adjustable feature may also allow the rider 26 to adjust a contrast or brightness of the screen 302.

In some embodiments, the VR docking station 300 includes various joints (e.g., linking and hinge mechanisms) that allow a rider 26 to move his or her head to look around while engaged with the VR docking station 300. Specifically, the VR docking station 300 may allow the rider 26 to turn his or her head from side to side and or move it up and down along tracks (e.g., semicircular tracks) or using a ball joint. The VR docking station 300 may include a full VR headset that the rider 26 engages with or it may include components (e.g., the VR screen 302) that engage with components in a headset on the rider 26 to facilitate presentation of VR effects as a full VR headset when coupled together. Further, it should be noted that the riders 26 may use a full or partial VR headset that they have placed on their heads prior to boarding the ride 10. In some embodiments, the VR headset includes a screen and docking with the ride 10 merely providing an input to the VR headset. However, in other embodiments, the VR screen 302 that provides the VR environment is integral with the ride 10 and the VR headset includes shell components, which may include lenses that engage with the VR screen 302 for the duration of the ride 10. These embodiments allow riders 26 to adjust the VR headsets or partial headsets on their heads/faces prior to boarding and may facilitate throughput for the ride 10 by avoiding delays caused by riders 26 making adjustments when they get seated. In some embodiments, only minor adjustments (e.g., focusing) and/or connecting the headset shell to the VR docking station 300 are done after boarding the ride 10. In still further embodiments, the VR docking station 300 facilitates short range wireless interaction with the VR headsets. Riders 26 may own their own VR headset and/or VR headset shell or may acquire one (e.g., via purchase or for return) while waiting in a queue for the ride 10.

As should be appreciated, the rider support unit 74 may include any other suitable head display screen that uses any suitable projecting principles and systems to project the desired environment to allow the rider 26 to experience the feeling of flight. For example, in certain embodiments, the rider support unit 74 may include a head display screen that utilizes OLED technology to display imagery.

The motion simulator ride 10 may operate under a control system 310, as shown in the block diagram of FIG. 11. The control system 310 may include a processor 312, which may include one or more processing devices, and a memory 314 storing instructions executable by the processor 312. The memory 314 may include one or more tangible, non-transitory, machine-readable media. By way of example, such machine-readable media can include RAM, ROM, EPROM, EEPROM, optical disk storage, magnetic disk storage or other magnetic storage devices, or any other medium which can be used to carry or store desired program code in the form of machine-executable instructions or data structures and which can be accessed by the processor 312 or by any general purpose or special purpose computer or other machine with a processor. The control system 310 may also include communications circuitry 316 and/or input and output circuitry 318 to facilitate communication with other components of the simulator ride 10. In addition, the control system 310 may be coupled, either directly or wirelessly, to an operator input device or operator interface 320 that, in operation, may be used by a ride technician to provide input used to control one or more ride features. The operator interface 320, or other components of the ride 10, may be located remotely from the control system 310 in certain embodiments and may be, for example, implemented on a mobile device.

In operation, the control system 310 may control movement of various components of the rider support assembly 12. It should be understood that the ride 10 may include some or all of the components of the rider support assembly 12 in the illustrated embodiment, depending on the configuration. For example, the control system 310 may communicate with and provide instructions to a bogie controller 324 to control velocity and/or braking. The control system 310 may also control flight simulation motion via control of a suspension rig controller 326 and a rotator ring controller 328. In addition, the control system 310 may also provide instructions to a rider row controller 330 to control positioning of the rider 26 and the restraint system 130, 240. For example, the control system 310 may actuate the restraint system 130, 240 after loading and before unloading to move the restraint system 130, 240 onto the restrained configuration and unrestrained configuration, respectively. The control system 310 may transmit a lock signal to the restraint system 130, 240 once the rider 26 is properly positioned within the rider support unit 74. In certain embodiments, the torso plate 114/torso rotating member 252a of the rider support unit 74 may include sensors that detect the presence of the rider 26. Once detected, the control system 310 may actuate the restraint system 130, 240 to move the restraint system 130, 240 from the unrestrained configuration to the restrained configuration, thereby restraining and securing the rider 26. Upon completion of the ride 10, the control system 310 may detect that the rider support assembly 12 is at an unloading station of the ride 10 and deactivate the restraint system 130, 240 to move the restraint system 130, 240 from the restrained configuration to the unrestrained configuration, thereby releasing the rider 26 from the rider support unit 74. In other embodiments, an operator of the ride 10 may actuate the restraint system 130, 240 manually or by activating a switch on the control system 310.

The control system 310 may also provide instructions to one or more special effects controllers, such as rider support effect controllers 332 (e.g., to control circuitry in the inversion table 108, torso plate 114, handle bars 134, or head gear to cause audio or visual effects, vibrations, impact effects, or changes in temperature) or display controllers 334. The control system 310 may be configured to independently address each rider support unit 74 for individual control of effects, e.g., each rider support unit 74 may be capable of providing unique and separate effects relative to other rider support units 74.

The rider support unit 74 may include the one or more sensors (e.g., on the foot rest 170, platform 226, handle bars 134, or combinations thereof) that may be used to control certain features of the rider support unit 74. For example, the one or more sensors may transmit a signal based on an input (e.g., an input from the rider 26 and/or component of the motion simulator ride 10) to the control system 310. Upon receiving the signal from the one or more sensors, the control system 310 may change an image on the display screen (e.g., on the individually addressable head gear 304) and/or tilt or lean the rider support unit 74. For example, the control system 310 may send instructions to the rider support effect controller 332 and/or the display controller 334 in response to the signal received from the one or more sensors. The instructions cause the rider support effect controller 332 and/or the display controller 334 to actuate special effect features (e.g., leaning or tilting) on the inversion table 108, the moveable base 210 or the individually addressable head gear 304 to create a realistic feeling of riding. In certain embodiments, the one or more sensors may transmit the signal directly to the rider support effect controller 332 and/or the display controller 334.

In one embodiment, the one or more sensors may be used to control movement of the inversion table 108 or moveable base 210. For example, the one or more sensors may include a pressure sensor that, when activated by the rider 26, outputs a signal to the rider support effects controller 332 to adjust a degree of rotation of the inversion table 108 or moveable base 210.

Certain existing motion simulator ride system use ride vehicles having walls that enclose a rider and may separate the rider from a desired environment of a motion simulator ride. These rider vehicles may not be suitable for providing the rider with an experience of riding flight. However, it is now recognized that by using an actuatable rider support unit with restraints as provided herein and positioning a projection screen below the rider or by using a headset-based display, the motion simulator ride may provide the rider with a realistic feeling of riding a motorcycle, bicycle, or on the back of an animal.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A motion simulator ride assembly comprising:
a motion base; and
a rider support assembly positioned beneath and coupled to the motion base, wherein the rider support assembly comprises a plurality of rider support units, each rider support unit of the plurality of rider support units comprising:
an inversion table having a first surface configured to abut a rider, wherein the inversion table is configured to rotate about an axis to transition between a loading configuration and a ride configuration, wherein the ride configuration positions the rider in a substantially facedown position, and
a restraint system configured to secure the rider onto the inversion table, wherein the restraint system comprises a first moveable restraint and a second moveable restraint that are each coupled to the inversion table, and wherein the first and second moveable restraints are configured to move relative to the first surface to move the first and second movable restraints from an unrestrained configuration to a restrained configuration; and
a display screen configured to project a simulated environment, wherein the display screen is positioned below the motion base.

2. The motion simulator ride assembly of claim 1, wherein the first moveable restraint comprises a first end rotatably coupled to the inversion table and a second end removably coupled to the inversion table.

3. The motion simulator ride assembly of claim 1, comprising a leg restraint having a fixed member, wherein the fixed member and the second moveable restraint are each coupled to the inversion table adjacent to a foot end of the inversion table, wherein the second moveable restraint is spaced apart from the fixed member and configured to move relative to the fixed member to transition the leg restraint from the restrained configuration to the unrestrained configuration.

4. The motion simulator ride assembly of claim 1, wherein the first moveable restraint comprises a fixed member extending from the first surface of the inversion table and a rotating member configured to move relative to the fixed member to transition the first moveable restraint from the restrained configuration to the unrestrained configuration, wherein the rotating member is positioned essentially orthogonal to the fixed member when in the restrained configuration.

5. The motion simulator ride assembly of claim 1, wherein the first moveable restraint comprises an inner surface, an outer surface, and a pair of handle bars extending away from the outer surface, and wherein the outer surface faces away from the rider when the rider is restrained within a rider support unit of the plurality of rider support units.

6. The motion simulator ride assembly of claim 1, comprising a pair of handle bars extending from a second surface of the inversion table, wherein the second surface faces away from the first surface.

7. The motion simulator ride assembly of claim 1, wherein each rider support unit of the plurality of rider support units comprises a cross-frame coupled to the inversion table, and wherein the inversion table is configured to rotate within and relative to the cross-frame.

8. The motion simulator ride assembly of claim 7, wherein each rider support unit of the plurality of rider support units comprises one or more sensors disposed on the inversion table and communicatively coupled to a controller of the motion simulator ride assembly, wherein the one or more sensors provide an output to the controller, and wherein the provided output is configured to control rotation of the inversion table.

9. The motion simulator ride assembly of claim 1, wherein the inversion table is coupled to an extending arm of each rider support unit of the plurality of rider support units.

10. The motion simulator ride assembly of claim 1, wherein the display screen is coupled to the rider support assembly.

11. The motion simulator ride assembly of claim 1, comprising a cable suspension rig coupled to the motion base and to a bogie configured to move the rider support assembly along a ride path.

12. A rider support assembly, comprising:
one or more rider support units, each rider support unit of the one or more rider support units comprising:
a moveable base having a first end, a second end, and a surface extending between the first end and the second end, wherein the moveable base is configured to support and position a rider substantially horizontally in a facedown position;
a restraint system comprising:
a torso restraint comprising a rotating restraint extending from the moveable base and configured to move relative to the surface from an unrestrained configuration to a restrained configuration;
a leg restraint positioned adjacent to the second end and comprising a fixed member and a moveable member spaced apart from the fixed member, wherein the moveable member is configured to move relative to the fixed member to move the leg restraint from an unrestrained configuration to a restrained configuration; and
a cross-frame coupled to the moveable base, wherein the moveable base is coupled to and configured to rotate within the cross-frame to move the moveable base from a substantially vertical position to a substantially horizontal position.

13. The rider support assembly of claim 12, wherein the moveable member is positioned essentially orthogonal to the fixed member in the unrestrained configuration and is positioned essentially parallel to the fixed member in the restrained configuration.

14. The rider support assembly of claim 12, wherein the restraint system comprises one or more straps coupled to the moveable base, each strap of the one or more straps comprising a free end configured to engage with a locking feature on the rotating restraint, wherein the free end is removably attached to the locking feature.

15. The rider support assembly of claim 12, comprising a virtual reality (VR) headset.

16. The rider support assembly of claim 12, comprising a torso plate coupled to the movable base, wherein the surface forms part of the torso plate.

17. The rider support assembly of claim 16, comprising a pair of handle bars extending from the movable base in a direction away from the surface, wherein at least a portion of the pair of handle bars is positioned substantially orthogonal to a longitudinal axis of the torso plate.

18. A motion simulator ride assembly comprising:
a rider support assembly comprising a plurality of rider support units, each rider support unit of the plurality of rider support units comprising:
a moveable base having a surface configured to abut a rider, wherein the moveable base is configured to rotate about an axis of the rider support assembly from a substantially vertical loading configuration to a ride configuration in which the rider is positioned substantially horizontally in a facedown position, and
a restraint system configured to secure the rider onto the rider support unit, wherein the restraint system comprises:
a torso restraint comprising a rotating restraint; and
a leg restraint comprising a first member and a second member, and wherein the rotating restraint and the second member are configured to move relative to the surface to transition the rotating restraint and the second member from an unrestrained configuration in the substantially vertical loading configuration to a restrained configuration in the ride configuration; and
a display screen configured to project a simulated environment wherein the display screen comprises a virtual reality (VR) display screen coupled to the rider support assembly.

19. The motion simulator ride assembly of claim 18, comprising a cross-frame coupled to the moveable base, wherein the moveable base is coupled to and configured to rotate within the cross-frame to move the moveable base from the substantially vertical configuration to the ride configuration.

20. The motion simulator ride assembly of claim 18, comprising an extending arm, wherein a portion of the moveable base is coupled to the extending arm and configured to move relative to the extending arm, wherein the moveable base is essentially parallel to the extending arm in the substantially vertical loading configuration such that a back surface of the moveable base abuts a surface of the extending arm, and wherein the moveable base is essentially orthogonal to the extending arm when the rider is in the facedown position.

* * * * *